United States Patent
Kim et al.

(10) Patent No.: US 8,232,357 B2
(45) Date of Patent: Jul. 31, 2012

(54) CATALYTIC COMPOSITION FOR PRODUCING 1-ALKENE AND ACRYLATES COPOLYMER AND METHOD FOR PRODUCING 1-ALKENE AND ACRYLATES COPOLYMER

(75) Inventors: Won-Hee Kim, Daejeon (KR); Byoung-Ho Jeon, Daejeon (KR); Kyung-Seop Noh, Daejeon (KR); Eun-Kyoung Song, Daejeon (KR); Ki-Su Ro, Daejeon (KR); Bae-Kun Shin, Incheon (KR)

(73) Assignee: LG Chem, Ltd. (KR)

( * ) Notice: Subject to any disclaimer, the term of this patent is extended or adjusted under 35 U.S.C. 154(b) by 162 days.

(21) Appl. No.: 12/745,274

(22) PCT Filed: Nov. 28, 2008

(86) PCT No.: PCT/KR2008/007056
§ 371 (c)(1), (2), (4) Date: May 28, 2010

(87) PCT Pub. No.: WO2009/069973
PCT Pub. Date: Jun. 4, 2009

(65) Prior Publication Data
US 2010/0324235 A1 Dec. 23, 2010

(30) Foreign Application Priority Data
Nov. 28, 2007 (KR) ................ 10-2007-0122198

(51) Int. Cl.
C08F 4/42 (2006.01)
C08F 118/02 (2006.01)
C08F 210/00 (2006.01)
C08F 4/26 (2006.01)
C08F 4/72 (2006.01)

(52) U.S. Cl. .......... 526/96; 526/319; 526/348; 526/103; 526/108

(58) Field of Classification Search .............. 526/96, 526/103, 319, 348, 108
See application file for complete search history.

(56) References Cited

U.S. PATENT DOCUMENTS
7,931,969 B2 * 4/2011 Lin .................. 428/411.1

FOREIGN PATENT DOCUMENTS
EP 0283972 A2 9/1988
(Continued)

OTHER PUBLICATIONS
Sharma et al., Journal of Molecular Catalysis A: Chemical, 214; 281-286 (2004).
Fan et al., Journal of Experimental Nanoscience, 1(4); 457-475 (2006).
International Search Report, PCT/KR2008/007056, dated Jul. 20, 2009.
(Continued)

Primary Examiner — William Cheung
(74) Attorney, Agent, or Firm — Lerner, David, Littenberg, Krumholz & Mentlik, LLP

(57) ABSTRACT

The present invention relates to a catalytic composition for producing a 1-alkene-acrylate copolymer that includes a metal nano catalyst, and a method for producing a 1-alkene-acrylate copolymer. In the catalytic composition for producing a 1-alkene-acrylate copolymer, since the content of the polar comonomer is high, it may be used to produce the 1-alkene-acrylate copolymer that has no crystallinity and is capable of being used as an optical material. The method for producing the 1-alkene-acrylate copolymer may be produced by using a simple process of a mild polymerization condition without a polymerization condition of high temperature and high pressure, and it is easy to control physical properties.

18 Claims, 4 Drawing Sheets

FOREIGN PATENT DOCUMENTS

| | | | |
|---|---|---|---|
| JP | 2000-319332 | A | 11/2000 |
| KR | 20070093366 | A | 9/2007 |
| KR | 20070093367 | A | 9/2007 |
| WO | 2007105898 | | 9/2007 |
| WO | WO-2007105898 | * | 9/2007 |

OTHER PUBLICATIONS

Moreno-Manas et al., Acc. Chem. Res., 36; 638-643 (2003).
Office Action from Chinese Applicatoin No. 20088011839, dated Aug. 24, 2011.

* cited by examiner

[Fig. 1]
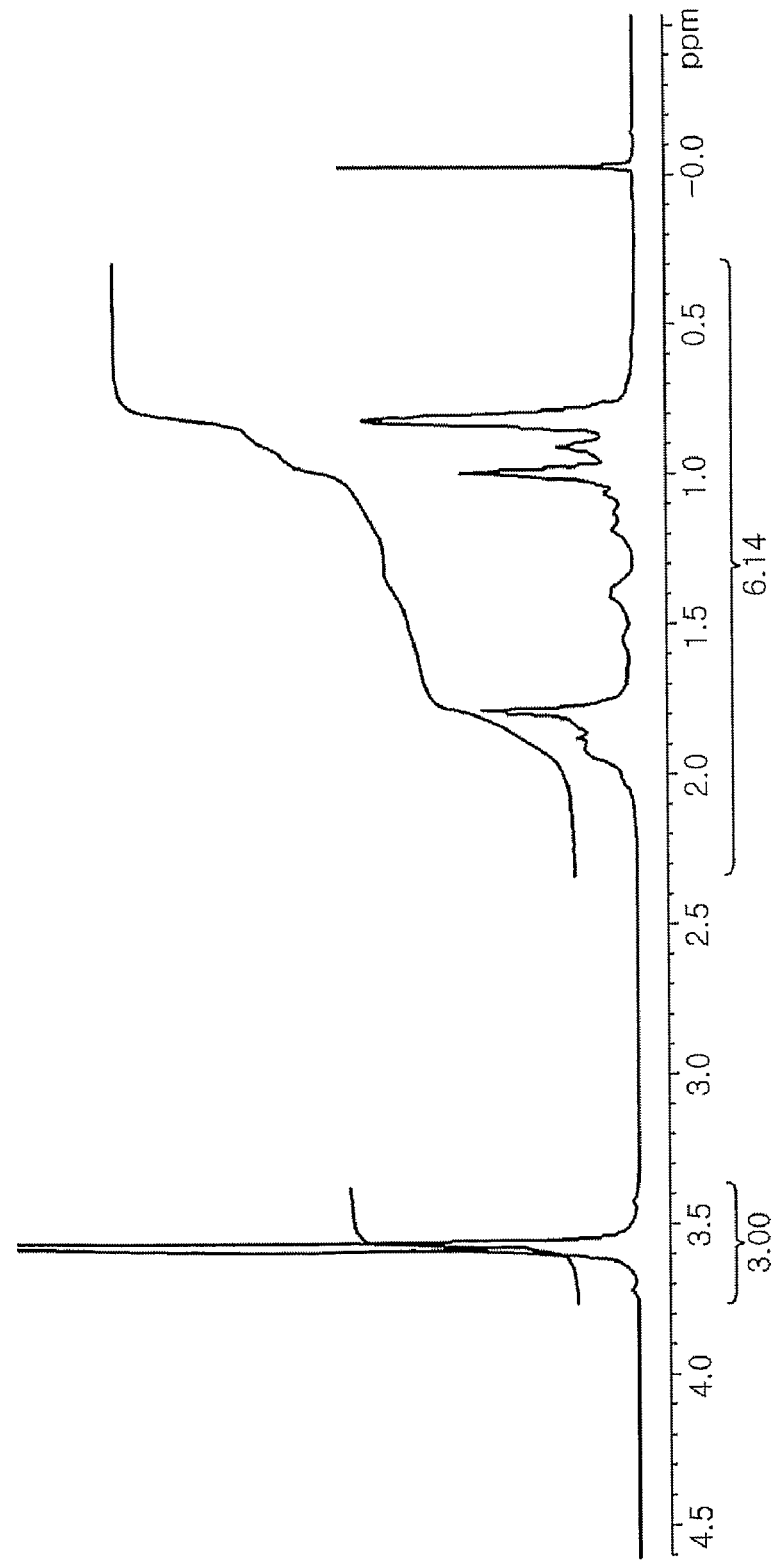

[Fig. 2]
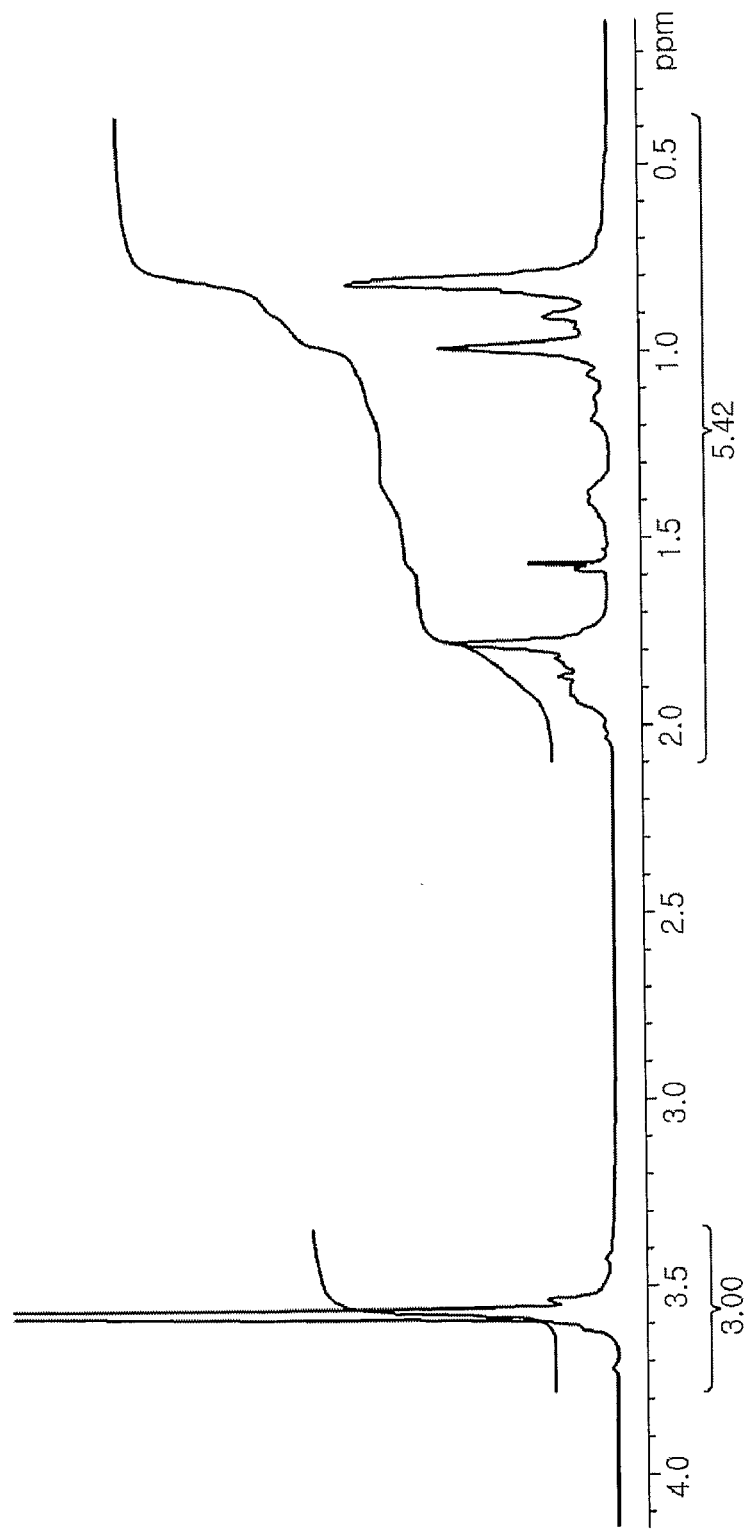

[Fig. 3]
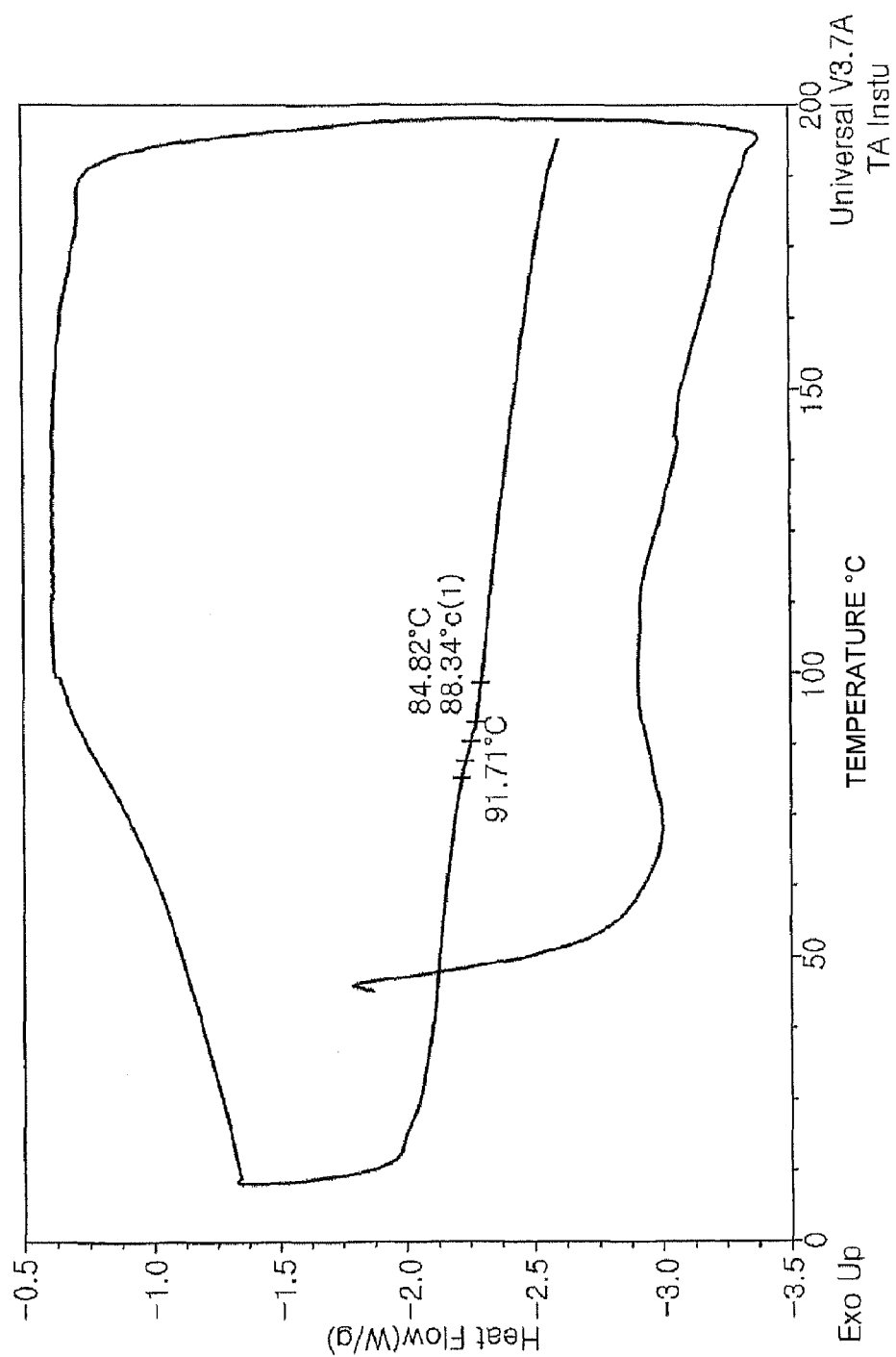

[Fig. 4]
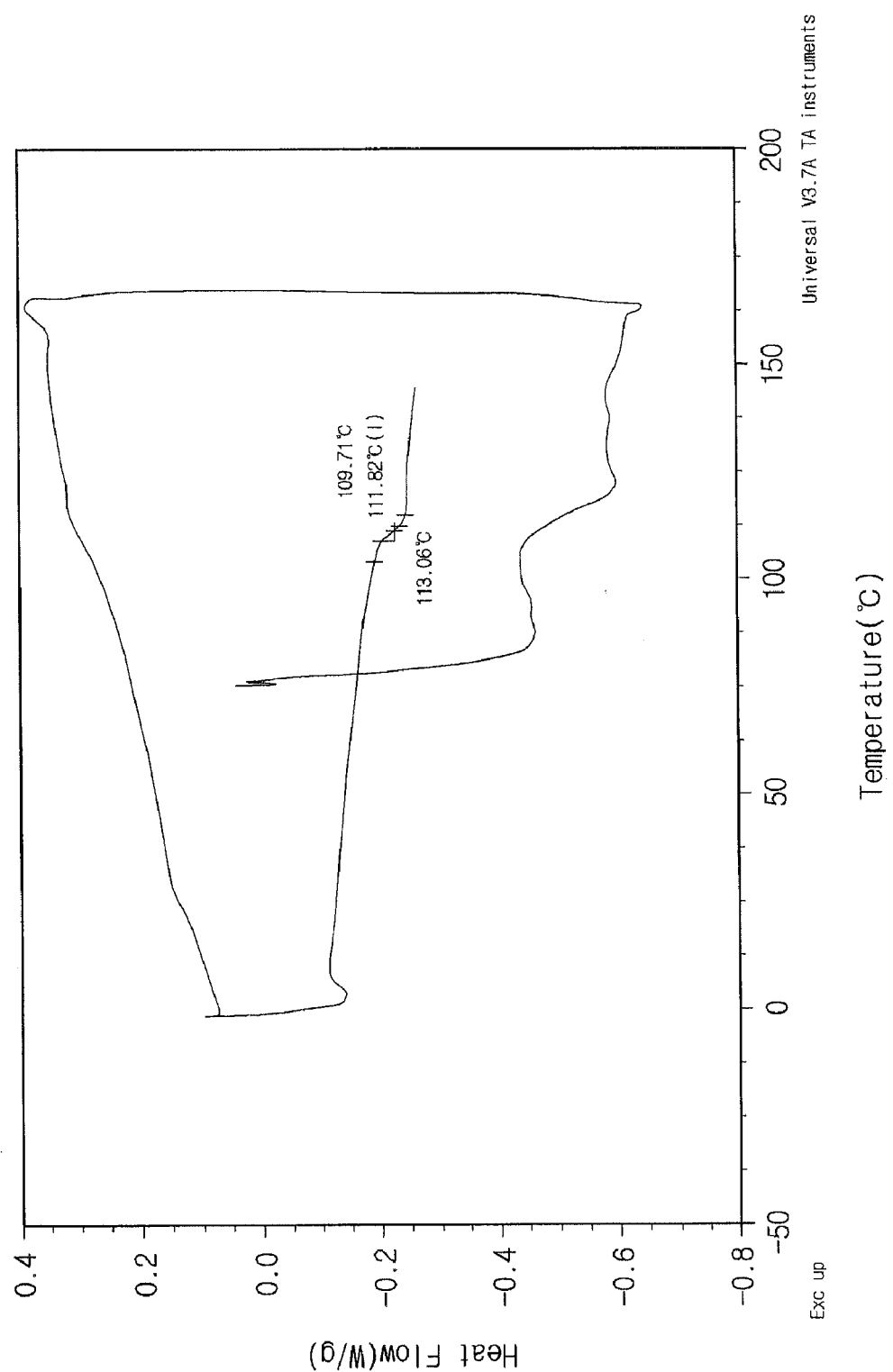

CATALYTIC COMPOSITION FOR PRODUCING 1-ALKENE AND ACRYLATES COPOLYMER AND METHOD FOR PRODUCING 1-ALKENE AND ACRYLATES COPOLYMER

CROSS REFERENCE TO RELATED APPLICATIONS

The present application is a national phase entry under 35 U.S.C. §371 of International Application No. PCT/KR2008-007056, filed Nov. 28, 2008, published in English, which claims priority from Korean Patent Application No. 10-2007-0122198, filed Nov. 28, 2007, all of which are incorporated herein by reference.

TECHNICAL FIELD

The present invention relates to a catalytic composition for producing a 1-alkene-acrylate copolymer that includes a metal nano catalyst, and a method for producing a 1-alkene-acrylate copolymer. This application claims priority from Korea Patent Application No. 10-2007-0122198 filed on Nov. 28, 2007 in the KIPO, the disclosure of which is incorporated herein by reference in its entirety.

BACKGROUND ART

In the case of when 1-alkene, in particular, ethylene is copolymerized in conjunction with an alkyl acrylate comonomer, a polymer that has different physical properties which are not capable of being obtained in a simple polyethylene may be formed. Examples of the physical properties include attachment strength, low temperature toughness and the like, and they may be largely improved according to an increase in content of the alkyl acrylate comonomer(s). Accordingly, the development of the copolymer that includes 1-alkene and another comonomer mixed with each other has been watched with the keen interest.

In a general known art, ethylene and an alkyl acrylate copolymer are obtained from a high temperature and high pressure reaction. Accordingly, there is disclosed a production method in which ethylene and the acrylate monomer are added simultaneously under a severe condition of 1000 atm or more and 100° C. or more by using a tube-type reactor or autoclave reactor. The polymer that is obtained under the above condition is a copolymer that includes 3 to 35% of acrylate monomer that is a polar monomer on the basis of ethylene.

However, in order to realize the high temperature and high pressure condition, additional devices such as a first compressor, a second compressor, a special reactor and the like are required in order to ensure safety of a worker. In addition, because of the severe process condition, in order to change a composition change of the copolymer in a desired direction, there are many limits.

In addition, the ethylene copolymer that is produced by using a known method includes a little polar group. That is, since the content of the polar monomer is not high, the crystallinity of polyethylene is present in the copolymer, thus there is a limit in use of the copolymer as an optical material such as a transparent film and the like.

In addition, in respects to the polymer that is obtained by using the high temperature and high pressure method in a known tube-type reactor or autoclave, products that do not largely affect the transparency have been mainly developed.

Therefore, there remains a need to develop a method for producing a novel polar copolymer, in which a copolymer having no crystallinity is capable of being produced because the content of the polar comonomer is high without the severe polymerization condition of high temperature and high pressure.

DISCLOSURE

Technical Problem

It is an object of the present invention to provide a catalytic composition for producing a 1-alkene-acrylate copolymer that is capable of being used to produce a copolymer that has no crystallinity because the content of the polar comonomer is high, and a method for producing a 1-alkene-acrylate copolymer, that is a simple process of a mild polymerization condition of 200 atm or less and 150° C. or less without a severe polymerization condition of high temperature and high pressure, and that easily controls the physical properties of the copolymer.

Technical Solution

The present invention provides a catalytic composition for producing a 1-alkene-acrylate copolymer that includes a metal nano catalyst.

In addition, the present invention provides a method for producing a 1-alkene-acrylate copolymer, which comprises the steps of polymerizing a 1-alkene monomer and an acrylate comonomer under a metal nano catalyst.

In addition, the present invention provides a 1-alkene-acrylate copolymer that is produced by using a method for producing the 1-alkene-acrylate copolymer.

In addition, the present invention provides an optical film that includes the 1-alkene-acrylate copolymer.

Advantageous Effects

In a catalytic composition for producing a 1-alkene-acrylate copolymer according to the present invention, since the content of the polar comonomer is high, it may be used to produce the 1-alkene-acrylate copolymer that has no crystallinity. The method for producing the 1-alkene-acrylate copolymer is a simple process of a mild polymerization condition without a polymerization condition of high temperature and high pressure, and it is easy to control physical properties.

DESCRIPTION OF DRAWINGS

FIG. 1 is hydrogen nuclear magnetic resonance spectrum ($^1$H-NMR spectrum) of the ethylene-methyl acrylate copolymer that is obtained in Example 3;

FIG. 2 is hydrogen nuclear magnetic resonance spectrum ($^1$H-NMR spectrum) of the ethylene-methyl acrylate copolymer that is obtained in Comparative Example 1;

FIG. 3 is a differential scanning calorimeter (DSC) graph of the copolymer that is obtained in Example 3; and FIG. 4 is a differential scanning calorimeter (DSC) graph of the copolymer that is obtained in Comparative Example 1.

BEST MODE

A catalytic composition for producing a 1-alkene-acrylate copolymer according to the present invention includes a metal nano catalyst represented by the following Formula 1:

$$M/N_xO_y$$  [Formula 1]

wherein M is selected from the group consisting of Group 3 to 12 transition metals, N is selected from the group consisting of Group 3 to 14 atoms, O is an oxygen atom, and x and y are determined by an oxidation state of N, x and y are each independently an integer in the range of 1 to 20, and M is a nanoparticle, and surrounded by a support that is made of $N_xO_y$, or is bonded and fixed in a state of absorption to the surface of the support.

At this time, it is preferable that $N_xO_y$ includes one or more metal oxides selected from the group consisting of aluminum oxide ($Al_2O_3$), yttrium oxide ($Y_2O_3$), zinc oxide ($ZrO_2$), hafnium oxide ($HfO_2$), silicon oxide ($SiO_2$), boron oxide ($B_2O_3$), cesium oxide ($CeO_2$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), ruthenium oxide ($Lu_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), $Dy_3Al_5O_{12}$, $Y_3Al_5O_{12}$ and $CeAl_{11}O_{18}$.

In addition, it is preferable that M includes one or more nanoparticles selected from the group consisting of Ru, Rh, Pd, Pt, Ir, Co, Cu, Sm, Au, Ag, Re, Ni, Fe, Os, and Sc.

It is preferable that the content of M in the metal nano catalyst is in the range of 0.1 to 10 wt % on the basis of the total content of the metal nano catalyst. If the content is more than 10 wt % or less than 0.1 wt %, the reactivity is largely reduced, which is undesirable.

It is preferable that the size of M in the metal nano catalyst is in the range of 2 to 200 nm. If the size of M is less than 2 nm or more than 200 nm, there is a problem in that the reactivity is largely reduced.

In general, the metal nano catalyst may be produced by fixing metal nanoparticles to an inorganic material support using a chemical or physical adsorption method or a sol-gel method.

As a term used in the present specification, "copolymer" includes all copolymers that are produced by using two or more comonomers.

A method for producing a 1-alkene-acrylate copolymer according to the present invention comprises the steps of polymerizing a 1-alkene monomer and an acrylate comonomer under a metal nano catalyst that is represented by the following Formula 1.

It is preferable that the metal nano catalyst is included in a content in the range of 0.01 to 200 mole % on the basis of the acrylate comonomer. In the case of when the content of the metal nano catalyst is less than 0.01 mole %, there is a problem in that the content of the 1-alkene monomer in the 1-alkene-acrylate copolymer is reduced, and in the case of when the content is more than 200 mole %, there is a problem in that when an agitation polymerization device is used, an agitation rate is reduced, which is undesirable.

In particular, since the metal nano catalyst has excellent stability to moisture, it is effective and may be reused.

In the method for producing the 1-alkene-acrylate copolymer, in a condition of a polymerization reaction, it is preferable that a pressure is in the range of 5 to 200 atm, and a temperature is in the range of 30 to 150° C. More preferably, that may be reacted under the condition in which the pressure is in the range of 20 to 50 atm, and the temperature is in the range of 50 to 80° C.

In the case of when the pressure is less than 5 atm, there is a problem in that the content of the 1-alkene monomer of the 1-alkene-acrylate copolymer is reduced, and in the case of when the pressure is more than 200 atm, it is required that an additional device is provided in a process. In addition, in the case of when the temperature is less than 30° C., there is a problem in that an initiator is not activated, and in the case of when the temperature is more than 150° C., there is a problem in process control.

As described above, the method for producing the 1-alkene-acrylate copolymer according to the present invention may produce the 1-alkene-acrylate copolymer under a mild condition of 200 atm or less and 150° C. or less by using the metal nano catalyst of Formula 1 unlike a known technology that requires a severe condition of high temperature and high pressure. Accordingly, in the method for producing the 1-alkene-acrylate copolymer according to the present invention, a process is simple, and the metal nano catalyst used in there is easily 100% recovered by using only a filtering device after the polymerization and is capable of being reused, thus largely reducing the production cost. In addition, since stability to moisture and air is excellent, efficiency is high, and the polymerization process may be simplified. Thus, the industrial applicability thereof is high.

Therefore, physical properties of the 1-alkene-acrylate copolymer that is produced by using the method for producing the 1-alkene-acrylate copolymer are easily controlled.

The acrylate comonomer that is used in the method for producing the 1-alkene-acrylate copolymer according to the present invention includes the compound that is represented by the following Formula 2.

[Formula 2]

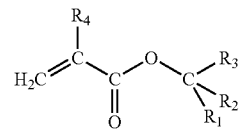

Wherein $R_1$, $R_2$ and $R_3$ are each independently a hydrogen atom, or a monovalent hydrocarbon group that includes a hetero atom and 1 to 30 carbon atoms; and $R_4$ is a hydrogen atom or an alkyl group having 1 to 6 carbon atoms.

At this time, it is preferable that the hydrocarbon group is alkyl, alkenyl, cycloalkyl, alkynyl, norbornyl or aryl.

The acrylate comonomer may be selected from the group consisting of alkyl acrylate that includes a $C_1$-$C_{12}$ straight- or branched-chained alkyl group, alkyl methacrylate that includes a $C_1$-$C_{12}$ straight- or branched-chained alkyl group and alkyl butacrylate that includes a $C_1$-$C_{12}$ straight- or branched-chained alkyl group.

The acrylate comonomer may further include one or more comonomers that are selected from the group consisting of vinyl acetate, hydroxy alkyl acrylate, carboxy alkyl acrylate, vinyl ester, acrylic acid, methacrylic acid, maleic anhydride and carbon monoxide.

It is preferable that the acrylate comonomer that is used in the method for producing the 1-alkene-acrylate copolymer according to the present invention is included in an amount in the range of 30 to 99 mole % on the basis of the total amount of the 1-alkene monomer and the acrylate comonomer. More preferably, the acrylate comonomer may be included in an amount in the range of 50 to 95 mole %. In the case of when the content of the acrylate comonomer is less than 30 mole %, there is a problem in attachment property of the 1-alkeneacrylate copolymer, and in the case of when the content is more than 99 mole %, there is a problem in that it is easily broken, which is undesirable.

In the case of when the content of the acrylate comonomer that is the polar monomer used in the method for producing the 1-alkene-acrylate copolymer according to the present invention is increased, the crystallinity that is an intrinsic physical property of the 1-alkene monomer such as ethylene may be prevented, thus the copolymer having no crystallinity may be produced. The 1-alkene-acrylate copolymer having no crystallinity is difficult to be produced by using a known technology.

Since the copolymer that is capable of being produced by using the method for producing the 1-alkene-acrylate copolymer according to the present invention has no crystallinity, high transparency, and excellent attachment property, it may be used as an optical material. In particular, since it includes a lot of polar functional groups, the attachment strength to the metal is excellent, thus it is usefully applied to electronic elements.

The 1-alkene monomer that is used in the method for producing the 1-alkene-acrylate copolymer according to the present invention may be selected from the group consisting of ethylene, propylene, 1-butene, 1-pentene, 1-hexene, 1-heptene, 1-octene, 1-nonene, 1-decene and norbornene.

As the norbornene of the 1-alkene monomers, the compound represented by the following Formula 3 is included.

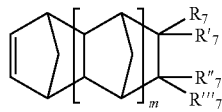

[Formula 3]

Wherein m is an integer in the range of 0 to 4, $R_7$, $R_7'$, $R_7''$ and $R_7'''$ include each independently a polar functional group or a nonpolar functional group, $R_7$, $R_7'$, $R_7''$ and $R_7'''$ may be connected to each other to form a saturated or unsaturated cyclic group having 4 to 12 carbon atoms or an aromatic ring having 6 to 24 carbon atoms.

The nonpolar functional group may be selected from the group consisting of hydrogen; halogen; straight- or branched-chained alkyl having 1 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; straight- or branched-chained alkenyl having 2 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; straight- or branched-chained alkynyl having 2 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, halo aryl, aralkyl, haloaralkyl, alkoxy, haloalkoxy, carbonyloxy, halocarbonyloxy, aryloxy, haloaryloxy, silyl and siloxy; cycloalkyl having 3 to 12 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbony-loxy, halocarbonyloxy, aryloxy, haloaryloxy, silyl and siloxy; aryl having 6 to 40 carbon atoms, that is substituted or unsubstituted by one or more substituent groups selected from the group consisting of halogen, alkyl, alkenyl, alkynyl, haloalkyl, haloalkenyl, haloalkynyl, aryl, halo aryl, aralkyl, haloaralkyl, alkoxy, haloalkoxy, carbonyloxy, halocarbonyloxy, aryloxy, haloaryloxy, silyl and siloxy; and aralkyl having 7 to 15 carbon atoms, that is substituted or unsubstituted by one or more substituent groups selected from the group consisting of halogen, alkyl, alkenyl, alkynyl, haloalkyl, haloalkenyl, haloalkynyl, aryl, halo aryl, aralkyl, haloaralkyl, alkoxy, haloalkoxy, carbonyloxy, halocarbonyloxy, aryloxy, haloaryloxy, silyl and siloxy.

In addition, the polar functional group is a non-hydrocarbonaceous polar group that includes the following formulas including at least one oxygen, nitrogen, phosphorus, sulfur, silicon, or boron, and is selected from the group consisting of $-R^8OR^9$, $-OR^9$, $-OC(O)OR^9$, $-R^8OC(O)OR^9$, $-C(O)R^9$, $-R^8C(O)OR^9$, $-OC(O)R^9$, $-R^8OC(O)R^9$, $-(R^8O)_k-OR^9$ (k is an integer in the range of 1 to 10), $-(OR^8)_k-OR^9$ (k is an integer in the range of 1 to 10), $-C(O)-O-C(O)R^9$, $-R^8C(O)-O-C(O)R^9$, $-SR^9$, $-R^8SR^9$, $-SSR^9$, $-R^8SSR^9$, $-S(=O)R^9$, $-R^8S(=O)R^9$, $-R^8C(=S)R^9$, $-R^8C(=S)SR^9$, $-R^8SO_2R^9$, $-SO_2R^9$, $-R^8OSO_2R^9$, $-R^8SO_3R^9$, $-SO_3R^9$, $-R^8OSO_3R^9$, $-R^8N=C=S$, $-N=C=S$, $-NCO$, $-R^8-NCO$, $-CN$, $-R^8CN$, $-NNC(=S)R^9$, $-R^8NNC(=S)R^9$, $-NO_2$, $-R^8NO_2$ and the following polar groups:

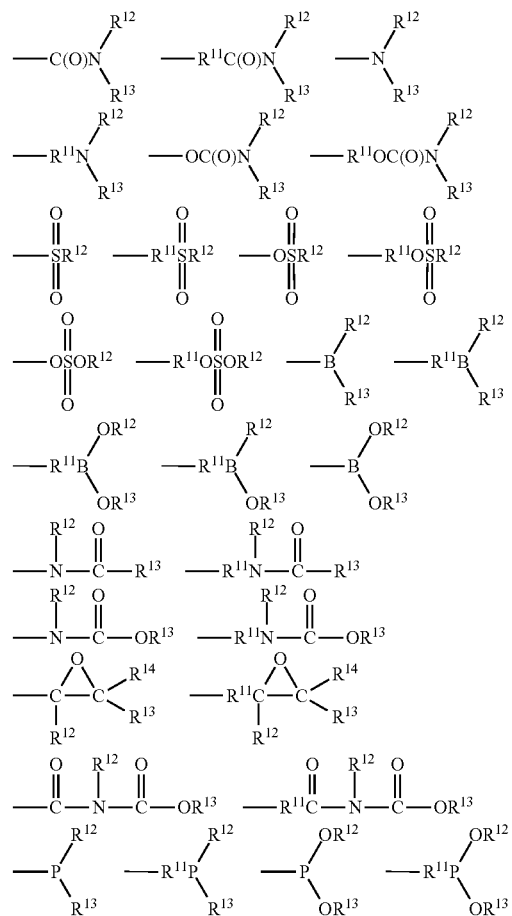

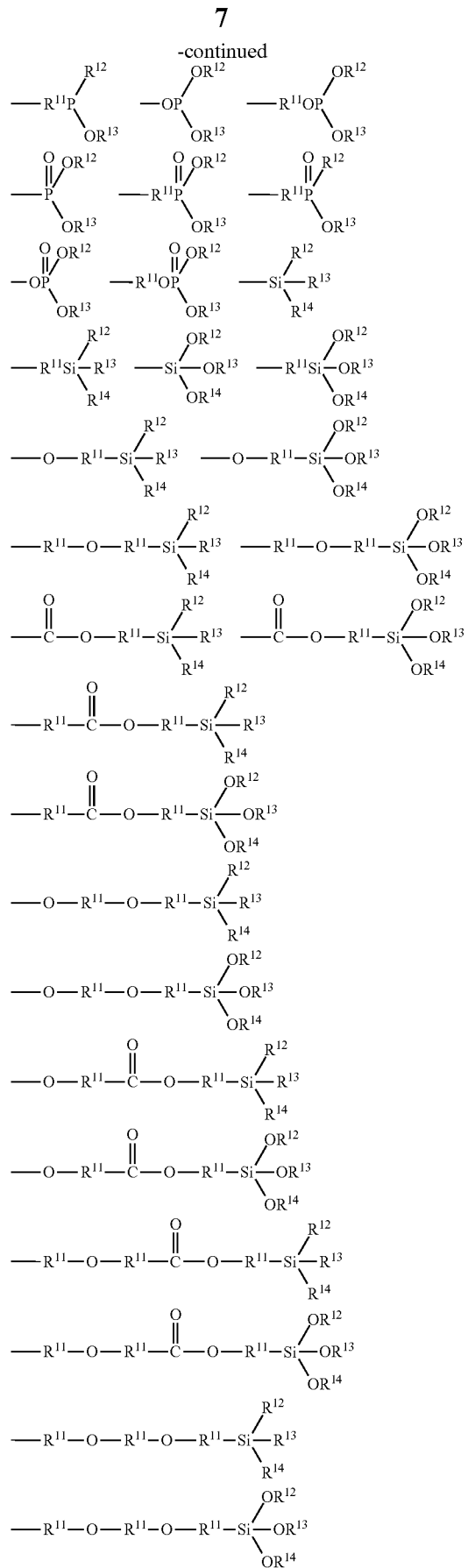
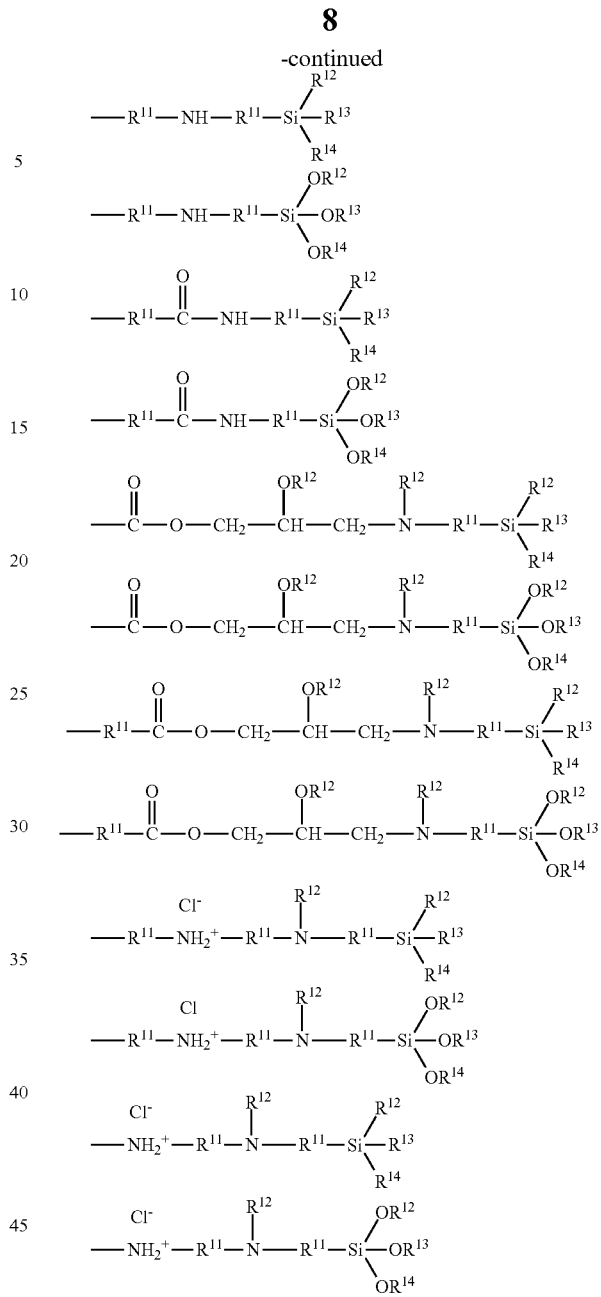

In the polar functional group, $R^8$ and $R^{11}$ are the same or different from each other, and each straight- or branched-chained alkylene having 1 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; straight- or branched-chained alkenylene having 2 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, halo aryl, aralkyl, haloaralkyl, alkoxy, haloalkoxy, carbonyloxy, halocarbonyloxy, aryloxy, haloaryloxy, silyl and siloxy; straight- or branched-chained alkynylene having 2 to 20 carbon atoms, that is substituted or unsubstituted by one or more substituent groups selected from the group consisting of halogen, alkyl, alkenyl, alkynyl, haloalkyl, halo alkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; cycloalkylene having 3 to 12 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; arylene having 6 to 40 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; aralkylene having 7 to 15 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; alkoxylene that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or carbonyloxylene that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, and two or more $R^{11}$'s may be the same or different from each other, and $R^9$, $R^{12}$, $R^{13}$ and $R^{14}$ are the same or different from each other, and each are any one selected from the group consisting of hydrogen; halogen; straight- or branched-chained alkyl having 1 to 20 carbon atoms, that is substituted or unsubstituted by one or more substituent groups selected from the group consisting of halogen, alkyl, alkenyl, alkynyl, halo alkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; straight- or branched-chained alkenyl having 2 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; straight- or branched-chained alkynyl having 2 to 20 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; cycloalkyl having 3 to 12 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; aryl having 6 to 40 carbon atoms, that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; aralkyl having 7 to 15 carbon atoms, that is substituted or unsubstituted by one or more substituent groups selected from the group consisting of halogen, alkyl, alkenyl, alkynyl, haloalkyl, haloalkenyl, haloalkynyl, aryl, halo aryl, aralkyl, haloaralkyl, alkoxy, haloalkoxy, carbonyloxy, halocarbonyloxy, aryloxy, haloaryloxy, silyl and siloxy; alkoxy that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or carbonyloxy that is substituted or unsubstituted by one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy.

Here, otherwise a specific description is given, alkyl, alkoxy and carbonyl preferably have 1 to 20 carbon atoms, alkenyl and alkynyl preferably have 2 to 20 carbon atoms, aryl preferably has 6 to 40 carbon atoms, and aralkyl preferably has 7 to 15 carbon atoms.

The compound that is represented by Formula 3 includes one or more selected from the group consisting of 5-ethyl ester-2-norbornene, t-butyl-5-norbornene-2-carboxylate (NB-THE), methyl-5-norbornene-2-methyl-2-carboxylate (NB-MMA), 5-methylene-2-norbornene and 5-n-butyl-2-norbornene.

In addition, the method for producing the 1-alkene-acrylate copolymer according to the present invention further comprises adding the polymerization initiator. It is preferable that the polymerization initiator includes one or more selected from the group consisting of peroxides and azo compounds. At this time, the polymerization initiator may be included in the 1-alkene-acrylate copolymer composition in a predetermined manner, for example, in a pure form, in a form in which it is dissolved in an appropriate solvent, and in a form in which it is mixed with a monomer or comonomer feed stream.

In addition, it is preferable that the content of the polymerization initiator is in the range of 0.001 to 0.1 mole % on the basis of the acrylate comonomer. In the case of when the content of the polymerization initiator is less than 0.001 mole %, the yield is low, and in the case of when the content is more than 0.1 mole %, there is a problem in that the 1-alkene-acrylate copolymer having the low molecular weight is generated because of the excessive amount of polymerization initiator.

Examples of the peroxides include, for example, hydrogen peroxide, decanonyl peroxide, t-butyl peroxy neodecanoate, t-butyl peroxy pyvalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, t-amyl peroxy neodecanoate, t-amyl peroxy pyvalate, t-amyl peroxy-2-ethyl hexanoate and 1,1,3,3-tetramethyl butyl hydroperoxide; alkali metal persulfate, perborate and percarbonate.

Examples of the azo compound include azo bisisobutyronitrate (AIBN).

In the method for producing the 1-alkene-acrylate copolymer according to the present invention, it is preferable that the polymerization reaction is carried out in one or more solvents selected from the group consisting of toluene, benzene, chlorobenzene, n-hexane, tetrahydrofuran, chloroform, ethanol, methanol, acetone, and methylene chloride.

As an embodiment of the method for producing the 1-alkene-acrylate copolymer according to the present invention, it is preferable that a condition in which the acrylate comonomer is methyl methacrylate or methyl acrylate, the 1-alkene monomer is ethylene or norbornene, the metal of the metal nano catalyst is a transition metal, the reaction pressure is in the range of 5 to 60 atm, the reaction temperature is in the range of 50 to 80° C., and AIBN is included as the polymerization initiator is provided.

In addition, the present invention provides a 1-alkene-acrylate copolymer that is produced by using the method for producing the 1-alkene-acrylate copolymer.

The film that is produced by using the 1-alkene-acrylate copolymer produced by using the catalytic composition according to the present invention has excellent flexibility and heat resistance as compared to a known technology.

In detail, since the 1-alkene-acrylate copolymer is a random copolymer of the 1-alkene monomer and the polar monomer, and has the very high content of polar group, there is no crystallinity of ethylene, thus after it is processed by using a polymer film, the transparency of the polymer is not affected. Accordingly, it may be used as an optical material.

The 1-alkene-acrylate copolymer includes a norbornene-methyl acrylate copolymer in which a glass transition temperature is in the range of 20 to 170° C., an ethylene-methyl methacrylate copolymer in which a glass transition temperature is in the range of 50 to 130° C., an ethylene-methyl acrylate copolymer in which a glass transition temperature is in the range of −50 to 20° C., and an ethylene-methyl acrylate-norbornene three-membered copolymer in which a glass transition temperature is in the range of 0 to 150° C.

It is preferable that in the 1-alkene-acrylate copolymer, the number average molecular weight is in the range of 5,000 to 150,000, and the weight average molecular weight is in the range of 10,000 to 500,000. In the case of when the number average molecular weight is less than 5,000 or the weight average molecular weight is less than 10,000, because of the low molecular weight, there may be a problem in physical properties according to the application field, and in the case of when the number average molecular weight is more than 150,000 or the weight average molecular weight is more than 500,000, there may be a problem in views of processing.

In the 1-alkene-acrylate copolymer, it is preferable that a temperature at which 50% of the initial weight is decomposed obtained in a thermogravimetric analysis (Td__50, median toxic dose) is in the range of 350 to 500° C., and Td__50 is changed according to the content of the 1-alkene monomer. In the case of when it is not copolymerized but only PMMA (poly methyl methacrylate) homopolymer is obtained, Td__50 is less than 350° C.

In addition, it is preferable that the 1-alkene-acrylate copolymer has the optical transparency in the range of 80 to 100%. When the optical transparency of the 1-alkene-acrylate copolymer is high, it is advantageous in views of use for optical materials such as optical films.

In addition, the present invention provides an optical film that includes the 1-alkene-acrylate copolymer.

Since the optical film is produced by using the acrylate copolymer having the high optical transparency, the optical film may have the high optical transparency, and since the content of the monomer having the polar functional group is high, the attachment property is excellent. Accordingly, it is suitable to be used as a layered film such as a polarizing plate. In detail, it may be used to produce a retardation compensation film having birefringence through the stretching or a polarizing film through the postprocessing using an iodine solution, and it may be used as various optical films.

MODE FOR INVENTION

A better understanding of the present invention may be obtained in light of the following Examples which are set forth to illustrate, but are not to be construed to limit the present invention.

An organic agent and a solvent that were required in the polymerization were manufactured by Aldrich, Co., Ltd. and purified by using a standard method, and ethylene was used after high pure products manufactured by Applied Gas Technology, Co., Ltd. passed through a moisture and oxygen filtering device.

In order to confirm the structure of the polymer catalyst, 500 MHz NMR manufactured by Varian, Co., Ltd. was used. The glass transition temperature of the polymer was measured by using DSC Q100 manufactured by TA Instrument, Co., Ltd., and Td__50 manufactured by the same company was used as TGA.

The molecular weight and the molecular weight distribution were obtained through analysis of the GPC (gel permeation chromatography) manufactured by Waters, Co., Ltd. The analysis temperature was 25° C., the tetrahydrofuran (THF) was used as the solvent, and the standardization was carried out by using polystyrene to obtain the number average molecular weight (Mn) and the weight average molecular weight (Mw).

Example 1

After the high pressure reaction device of 125 mL was vacuumized, argon was filled. Into the reactor under the argon atmosphere, the metal nano catalyst (2.86 g, 28.05 mmol) that included ruthenium in the content of 0.1 wt %, 23 mL of toluene, and methyl methacrylate (2.81 g, 28.05 mmol) were put. In addition, AIBN that was the initiator dissolved in toluene was added in an amount of 0.056 mmol. Subsequently, after ethylene at 30 bar was charged, the temperature of the reactor was increased to 70° C., the agitation was carried out by using the magnetic bar at a rate of 500 rpm, and they were polymerized for 18 hours to prepare the polymer solution.

After the polymerization reaction was finished, the reaction temperature was reduced to normal temperature, and the metal nano catalyst was recovered by using filtering. After that, the polymer solution from which the metal nano catalyst was removed was dropped on ethanol that was the nonsolvent to precipitate the polymer in a solid form. The solid phase was precipitated to remove the supernatant, ethanol was added thereto, they were washed once again, water was added thereto and they were agitated in order to make particles firm, and they were filtered to recover the copolymer. The copolymer thusly obtained was dried for one day at 80° C. in a vacuum oven.

Example 2

The copolymer was produced by using the same polymerization reaction condition and post-treatment process as Example 1, except that the metal nano catalyst having ruthenium in the content of 1 wt % was used.

Example 3

The copolymer was produced by using the same polymerization reaction condition and post-treatment process as Example 1, except that the metal nano catalyst having ruthenium in the content of 5 wt % was used.

Example 4

The copolymer was produced by using the same polymerization reaction condition and post-treatment process as Example 1, except that the metal nano catalyst having palladium in the content of 0.1 wt % was used.

Example 5

The copolymer was produced by using the same polymerization reaction condition and post-treatment process as Example 1, except that the metal nano catalyst having palladium in the content of 1 wt % was used.

Example 6

The copolymer was produced by using the same polymerization reaction condition and post-treatment process as Example 1, except that the metal nano catalyst having palladium in the content of 5 wt % was used.

Example 7

The copolymer was produced by using the same polymerization reaction condition and post-treatment process as Example 1, except that the metal nano catalyst having palladium in the content of 10 wt % was used.

Example 8

The copolymer was produced by using the same polymerization reaction condition and post-treatment process as Example 1, except that the metal nano catalyst having platinum in the content of 5 wt % was used.

Example 9

The copolymer was produced by using the same polymerization reaction condition and post-treatment process as Example 1, except that the metal nano catalyst having iridium in the content of 5 wt % was used.

Example 10

The copolymer was produced by using the same polymerization reaction condition and post-treatment process as Example 1, except that the metal nano catalyst having rhodium in the content of 5 wt % was used.

Example 11

The copolymer was produced by using the same polymerization reaction condition and post-treatment process as Example 1, except that the metal nano catalyst having copper in the content of 5 wt % was used.

Specific experimental conditions and the results of Examples 1 to 11 are described in the following Table 1.

TABLE 1

| section | metal nano cat. | metal cont. (wt %) | cat./MMA (molar ratio) | AIBN/MMA (molar ratio) | pressure (bar) | temp. (°C.) | time (hr) | ethylene cont. (mol %) | Tg (°C.) | recovered nano cat. (wt %) |
|---|---|---|---|---|---|---|---|---|---|---|
| Ex. 1 | Ru/Al$_2$O$_3$ | 0.1 | 1 | 0.002 | 30 | 70 | 18 | 11.5 | 114 | 99% |
| Ex. 2 | Ru/Al$_2$O$_3$ | 1 | 1 | 0.002 | 30 | 70 | 18 | 13.6 | 111 | 98% |
| Ex. 3 | Ru/Al$_2$O$_3$ | 5 | 1 | 0.002 | 30 | 70 | 18 | 22.2 | 88 | 99% |
| Ex. 4 | Pd/Al$_2$O$_3$ | 0.1 | 1 | 0.002 | 30 | 70 | 18 | 9.3 | 117 | 99% |
| Ex. 5 | Pd/Al$_2$O$_3$ | 1 | 1 | 0.002 | 30 | 70 | 18 | 13.2 | 112 | 98% |
| Ex. 6 | Pd/Al$_2$O$_3$ | 5 | 1 | 0.002 | 30 | 70 | 18 | 16.8 | 99 | 99% |
| Ex. 7 | Pd/Al$_2$O$_3$ | 10 | 1 | 0.002 | 30 | 70 | 18 | 8.7 | 119 | 99% |
| Ex. 8 | Pt/Al$_2$O$_3$ | 5 | 1 | 0.002 | 30 | 70 | 18 | 11.5 | 115 | 97% |
| Ex. 9 | Ir/Al$_2$O$_3$ | 5 | 1 | 0.002 | 30 | 70 | 18 | 11.9 | 116 | 98% |
| Ex. 10 | Rh/Al$_2$O$_3$ | 5 | 1 | 0.002 | 30 | 70 | 18 | 13.8 | 110 | 99% |
| Ex. 11 | Cu/Al$_2$O$_3$ | 5 | 1 | 0.002 | 30 | 70 | 18 | 12.7 | 113 | 99% |

Comparative Example 1

After the high pressure reaction device of 125 mL was vacuumized, argon was filled. Into the reactor under the argon atmosphere, aluminum oxide (2.86 g, 28.05 mmol), toluene (23 mL), and methyl methacrylate (2.81 g, 28.05 mmol) were put. In addition, AIBN that was the initiator dissolved in toluene was added in an amount of 0.056 mmol. Subsequently, after ethylene at 30 bar was charged, the temperature of the reactor was increased to 70° C., the agitation was carried out by using the magnetic bar at a rate of 500 rpm, and they were polymerized for 18 hours to prepare the polymer solution.

After the polymerization reaction was finished, the reaction temperature was reduced to normal temperature, and the aluminum oxide was recovered by using filtering. After that, the polymer solution from which the aluminum oxide was removed was dropped on ethanol that was the nonsolvent to precipitate the polymer in a solid form. The solid phase was precipitated to remove the supernatant, ethanol was added thereto, they were washed once again, water was added thereto and they were agitated in order to make particles firm, and they were filtered to recover the copolymer. The copolymer thusly obtained was dried for one day at 80° C. in a vacuum oven.

Comparative Example 2

The copolymer was produced by using the same polymerization reaction condition and post-treatment process as Comparative Example 1, except that 5.72 g of aluminum oxide was used.

Specific experimental conditions and the results of Comparative Examples 1 to 2 are described in the following Table 2.

TABLE 2

| section | aluminium oxide | Al$_2$O$_3$/MMA (molar ratio) | AIBN/MMA (molar ratio) | pressure (bar) | temp. (° C.) | time (hr) | ethylene content (mol %) | Tg (° C.) |
| --- | --- | --- | --- | --- | --- | --- | --- | --- |
| Comp. Ex. 1 | Al$_2$O$_3$ | 1 | 0.002 | 30 | 70 | 18 | 9.5 | 112 |
| Comp. Ex. 2 | Al$_2$O$_3$ | 2 | 0.002 | 30 | 70 | 18 | 10.5 | 110 |

Example 12

After the high pressure reaction device of 125 mL was vacuumized, argon was filled. Into the reactor under the argon atmosphere, the metal nano catalyst (2.86 g, 28.05 mmol) that included ruthenium in the content of 5 wt %, 23 mL of toluene, and methyl methacrylate (2.41 g, 28.05 mmol) were put. In addition, AIBN that was the initiator dissolved in toluene was added in an amount of 0.056 mmol. Subsequently, after ethylene at 30 bar was charged, the temperature of the reactor was increased to 70° C., the agitation was carried out by using the magnetic bar at a rate of 500 rpm, and they were polymerized for 18 hours to prepare the polymer solution. After that, the polymerization post-treatment process was carried out by using the same method as Example 1 to produce the copolymer.

Example 13

The copolymer was produced by using the same polymerization reaction condition and post-treatment process as Example 1, except that the content of the initiator was 0.028 mmol.

Specific experimental conditions and the results of Examples 12 to 13 are described in the following Table 3.

TABLE 3

| section | RuCat./MA (molar ratio) | AIBN/MA (molar ratio) | pressure (bar) | temp. (° C.) | time (hr) | ethylene content (mol %) | Tg (° C.) | Td_50 (° C.) | Mw | PDI |
| --- | --- | --- | --- | --- | --- | --- | --- | --- | --- | --- |
| Ex. 12 | 1 | 0.002 | 30 | 70 | 18 | 23.8 | 88 | 409.2 | 93500 | 2.1 |
| Ex. 13 | 1 | 0.001 | 30 | 70 | 18 | 24.2 | 81 | 405.3 | 94700 | 2.2 |

Example 14

After the high pressure reaction device of 125 mL was vacuumized, argon was filled. Into the reactor under the argon atmosphere, the metal nano catalyst (4.13 g, 14.03 mmol) that included ruthenium in the content of 5 wt %, 23 mL of toluene, methyl methacrylate (2.81 g, 28.05 mmol) and 56.1 mmol of norbornene were put. In addition, AIBN that was the initiator dissolved in toluene was added in an amount of 0.056 mmol. Subsequently, the temperature of the reactor was increased to 60° C., the agitation was carried out by using the magnetic bar at a rate of 500 rpm, and they were polymerized for 18 hours to prepare the polymer solution. After that, the polymerization post-treatment process was carried out by using the same method as Example 1 to produce the copolymer.

Example 15

The copolymer was produced by using the same polymerization reaction condition and post-treatment process as Example 14, except that the temperature was 65° C.

Example 16

After the high pressure reaction device of 125 mL was vacuumized, argon was filled. Into the reactor under the argon atmosphere, the metal nano catalyst (2.86 g, 28.05 mmol) that included ruthenium in the content of 5 wt %, 23 mL of toluene, methyl methacrylate (2.81 g, 28.05 mmol) and 56.1 mmol of norbornene were put. In addition, AIBN that was the initiator dissolved in toluene was added in an amount of 0.056 mmol. Subsequently, the temperature of the reactor was increased to 70° C., the agitation was carried out by using the magnetic bar at a rate of 500 rpm, and they were polymerized for 18 hours to prepare the polymer solution. After that, the polymerization post-treatment process was carried out by using the same method as Example 1 to produce the copolymer.

Specific experimental conditions and the results of Examples 14 to 16 are described in the following Table 4.

TABLE 4

| section | RuCat./MA (molar ratio) | AIBN/MA (molar ratio) | MA/Nb (molar ratio) | temp. (° C.) | time (hr) | ethylene content (mol %) | Tg (° C.) | Td_50 (° C.) | Mw | PDI |
| --- | --- | --- | --- | --- | --- | --- | --- | --- | --- | --- |
| Ex. 14 | 0.5 | 0.002 | 0.5 | 60 | 18 | 25.1 | 73.4 | 430.2 | 21400 | 2.3 |
| Ex. 15 | 0.5 | 0.002 | 0.5 | 65 | 18 | 25.3 | 75.1 | 435.5 | 30300 | 2.4 |
| Ex. 16 | 1 | 0.002 | 0.5 | 70 | 18 | 28.5 | 84.2 | 446.7 | 53600 | 2.1 |

All the structures of the copolymers that were obtained in Examples 1 to 16 were analyzed by using the nuclear magnetic resonance spectrum. In each obtained copolymer, the homopolymer of ethylene or norbornene was not confirmed but the random copolymer was generated.

The $^1$H NMR measurement results and the DSC measurement results to the copolymers that were obtained in Example 3 and Comparative Example 1 were shown in FIGS. 1 to 4. As shown in FIGS. 1 and 2, since the metal nano catalyst has higher activity than metal oxides, the content of ethylene is increased. In addition, as shown in FIGS. 3 and 4, a melting temperature that was shown in a known polyolefin was not observed, but the glass transition temperature (Tg) was observed once. Accordingly, the homopolymer was not confirmed, and the copolymers that were produced by Examples were a non-crystalline copolymer in which a phase is not changed when the temperature is changed.

In addition, in the case of the copolymers that were obtained in Examples 12 and 15, Td_50 was shown at 400° C. or higher, which was higher than 350° C. corresponding to Td_50 of known PMMA. Accordingly, in the case of when it is used under the high temperature condition, since a risk of deformation by heat is reduced, it may be applied to the case of electronic devices requiring heat.

In addition, in the case of LDPE (low density polyethylene), and EVA (ethylene vinyl acetate) that are obtained by using a known high temperature and high pressure method, the molecular weight distribution is wide and the logMw value is 4 or more. However, it can be seen that the copolymers that are produced by a radical polymerization method using the catalytic composition according to the present invention and obtained in Examples 12 to 16 have a narrow molecular weight distribution (PDI) of less than 2.5. As described above, in the case of when the polymer has a narrow molecular weight distribution, various physical properties may be improved.

In addition, like in Examples 1 to 11, almost 100% of the metal nano catalyst is recovered, and stability to air and moisture is excellent, thus it may be reused.

INDUSTRIAL APPLICABILITY

In a catalytic composition for producing a 1-alkene-acrylate copolymer according to the present invention, since the content of the polar comonomer is high, it may be used to produce the 1-alkene-acrylate copolymer that has no crystallinity. The method for producing the 1-alkene-acrylate copolymer is a simple process of a mild polymerization condition without a polymerization condition of high temperature and high pressure, and it is easy to control physical properties.

The invention claimed is:

1. A catalytic composition for producing a 1-alkene-acrylate copolymer that includes a metal nano catalyst represented by the following Formula 1:

$$M/N_xO_Y \qquad \text{[Formula 1]}$$

wherein M is selected from the group consisting of Ru, Rh, Pd, Pt, Ir, Co, Cu, Sm, Au, Ag, Re, Ni, Fe, and Os, having the particle size in the range of 2 to 200 nm, N is selected from the group consisting of Group 3 to 14 atoms, O is an oxygen atom, and x and y are determined by an oxidation state of N, x and y are each independently an integer in the range of 1 to 20, and M is a nanoparticle surrounded by a support that is made of $N_xO_y$, or is bonded and fixed in a state of absorption to the surface of the support, and the content of M is in the range of 0.1 to 10 wt % on the basis of the total content of the metal nano catalyst.

2. The catalytic composition for producing a 1-alkene-acrylate copolymer as set forth in claim 1, wherein the $N_xO_y$ includes one or more metal oxides selected from the group consisting of aluminum oxide ($Al_2O_3$), yttrium oxide ($Y_2O_3$), zinc oxide ($ZnO_2$), hafnium oxide ($HfO_2$), silicon oxide ($SiO_2$), boron oxide ($B_2O_3$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), ruthenium oxide ($Ru_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), $Dy_3Al_5O_{12}$, $Y_3Al_5O_{12}$ and $CeAl_{11}O_{18}$.

3. A method for producing a 1-alkene-acrylate copolymer, the method comprising the steps of polymerizing a 1-alkene monomer and an acrylate comonomer under a metal nano catalyst that is represented by the following Formula 1:

$$M/N_xO_y \qquad \text{[Formula 1]}$$

wherein M is selected from the group consisting of Ru, Rh, Pd, Pt, Ir, Co, Cu, Sm, Au, Ag, Re, Ni, Fe, and Os, having the particle size in the range of 2 to 200 nm, N is selected from the group consisting of Group 3 to 14 atoms, O is an oxygen atom, and x and y are determined by an oxidation state of N, x and y are each independently an integer in the range of 1 to 20, and M is a nanoparticle surrounded by a support that is made of $N_xO_y$, or is bonded and fixed in a state of absorption to the surface of the support, and the content of M is in the range of 0.1 to 10 wt % on the basis of the total content of the metal nano catalyst.

4. The method for producing a 1-alkene-acrylate copolymer as set forth in claim 3, wherein the metal nano catalyst is included in a content in the range of 0.01 to 200 mole % on the basis of the acrylate comonomer.

5. The method for producing a 1-alkene-acrylate copolymer as set forth in claim 3, wherein in a condition of a polymerization reaction, a pressure is in the range of 5 to 200 atm, and a temperature is in the range of 30 to 150° C.

6. The method for producing a 1-alkene-acrylate copolymer as set forth in claim 3, wherein the acrylate comonomer includes a compound that is represented by the following Formula 2:

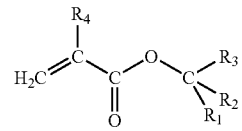

[Formula 2]

wherein $R_1$, $R_2$ and $R_3$ are each independently a hydrogen atom, or a monovalent hydrocarbon group that includes a hetero atom and 1 to 30 carbon atoms; and $R_4$ is a hydrogen atom or an alkyl group having 1 to 6 carbon atoms.

7. The method for producing a 1-alkene-acrylate copolymer as set forth in claim 3, wherein the acrylate comonomer is selected from the group consisting of alkyl acrylate that includes a $C_1$-$C_{12}$ straight- or branched-chained alkyl group, alkyl methacrylate that includes a $C_1$-$C_{12}$ straight- or branched-chained alkyl group, and alkyl butacrylate that includes a $C_1$-$C_{12}$ straight- or branched-chained alkyl group.

8. The method for producing a 1-alkene-acrylate copolymer as set forth in claim 3, wherein the acrylate comonomer further includes one or more comonomers that are selected from the group consisting of vinyl acetate, hydroxy alkyl acrylate, carboxy alkyl acrylate, vinyl ester, acrylic acid, methacrylic acid, maleic anhydride and carbon monoxide.

9. The method for producing a 1-alkene-acrylate copolymer as set forth in claim 3, wherein the acrylate comonomer is included in an amount in the range of 30 to 99 mole % on the basis of the total amount of the 1-alkene monomer and the acrylate comonomer.

10. The method for producing a 1-alkene-acrylate copolymer as set forth in claim 3, wherein the 1-alkene monomer includes one or more selected from the group consisting of ethylene, propylene, 1-butene, 1-pentene, 1-hexene, 1-heptene, 1-octene, 1-nonene, 1-decene and compounds that are represented by the following Formula 3:

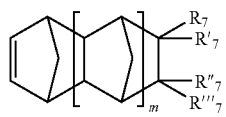

[Formula 3]

wherein m is an integer in the range of 0 to 4, $R_7$, $R'_7$, $R''_7$ and $R'''_7$ include each independently a polar functional group or a nonpolar functional group, $R_7$, $R'_7$, $R''_7$ and $R'''_7$ may be connected to each other to form a saturated or unsaturated cyclic group having 4 to 12 carbon atoms or an aromatic ring having 6 to 24 carbon atoms.

11. The method for producing a 1-alkene-acrylate copolymer as set forth in claim 3, further comprising:

adding a polymerization initiator.

12. The method for producing a 1-alkene-acrylate copolymer as set forth in claim 3, wherein the polymerization reaction is carried out in one or more solvents selected from the group consisting of toluene, benzene, chlorobenzene, n-hexane, tetrahydrofuran, chloroform, ethanol, methanol, acetone, and methylene chloride.

13. A 1-alkene-acrylate copolymer that is produced by using a method for producing the 1-alkene-acrylate copolymer of claim 3.

14. The 1-alkene-acrylate copolymer as set forth in claim 13, wherein the 1-alkene-acrylate copolymer includes a norbornene-methyl acrylate copolymer in which a glass transition temperature is in the range of 20 to 170° C.

15. The 1-alkene-acrylate copolymer as set forth in claim 13, wherein the 1-alkene-acrylate copolymer includes an ethylene-methyl methacrylate copolymer in which a glass transition temperature is in the range of 50 to 130° C.

16. The 1-alkene-acrylate copolymer as set forth in claim 13, wherein the 1-alkene-acrylate copolymer includes an ethylene-methyl acrylate copolymer in which a glass transition temperature is in the range of −50 to 20° C.

17. The 1-alkene-acrylate copolymer as set forth in claim 13, wherein the 1-alkene-acrylate copolymer includes an ethylene-methyl acrylate-norbornene three-membered copolymer in which a glass transition temperature is in the range of 0 to 150° C.

18. An optical film comprising the 1-alkene-acrylate copolymer of claim 13.

* * * * *

UNITED STATES PATENT AND TRADEMARK OFFICE
CERTIFICATE OF CORRECTION

PATENT NO. : 8,232,357 B2
APPLICATION NO. : 12/745274
DATED : July 31, 2012
INVENTOR(S) : Won-Hee Kim et al.

Page 1 of 1

It is certified that error appears in the above-identified patent and that said Letters Patent is hereby corrected as shown below:

In the Claims
Column 17, line 61, "the particle" should read --a particle--.
Column 18, line 26, "the particle" should read --a particle--.

Signed and Sealed this
Twenty-fourth Day of December, 2013

Margaret A. Focarino
*Commissioner for Patents of the United States Patent and Trademark Office*